(12) United States Patent
Hiraki et al.

(10) Patent No.: US 6,337,060 B1
(45) Date of Patent: *Jan. 8, 2002

(54) HYDROPHILIC DIAMOND PARTICLES AND METHOD OF PRODUCING THE SAME

(75) Inventors: Akio Hiraki, F-102, 91, Minamigasa-cho, Kusatsu-shi, Shiga-ken; Toshimichi Ito, Minoo; Akimitsu Hatta, Suita; Hiroshi Makita, Kawanishi; Kazuhito Nishimura, Kitakyushu; Hiroshi Ishizuka, Tokyo; Satoru Hosomi, Oyama, all of (JP)

(73) Assignees: The Ishizuka Research Institute, Ltd., Kanagawa-ken; Akio Hiraki, Shiga-ken, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/662,022

(22) Filed: Jun. 12, 1996

(30) Foreign Application Priority Data

Jul. 10, 1995 (JP) ............................................. 7-206399

(51) Int. Cl.$^7$ ................................................ C01B 31/06
(52) U.S. Cl. ...................................................... 423/446
(58) Field of Search .......................... 423/446; 264/31, 264/344, 341

(56) References Cited

U.S. PATENT DOCUMENTS

| 5,133,792 A | * | 7/1992 | Purahit et al. | 423/446 |
| 5,268,201 A | * | 12/1993 | Komaki et al. | 423/446 |
| 5,485,804 A | * | 1/1996 | Adair et al. | 117/90 |

* cited by examiner

*Primary Examiner*—Stuart L. Hendrickson
(74) *Attorney, Agent, or Firm*—Larson & Taylor PLC

(57) ABSTRACT

The principal objects of the invention is to provide diamond fine particles with a surface nature so improved as to form a stable, uniform suspension or dispersion in a common medium such as water and alcohol. Another object is to provide an effective technique for producing hydrophilic diamond fine particles by chemically modifying the particle surface nature, while removing at the same time contaminants and foreign materials which coexist with the diamond. In the invention, diamond particles are treated by boiling in the treatment fluid of sulfuric acid solution, which is in particular of concentrated or fuming nature, at a temperature more than 200° C., which is preferably 250° C. or more.

14 Claims, No Drawings

HYDROPHILIC DIAMOND PARTICLES AND METHOD OF PRODUCING THE SAME

FIELD OF THE INVENTION

This invention relates to fine particles of hydrophilic diamond which can effectively provide a single layer of particles when used in lubrication, surface mondification, abrasive applications, etc. The invention also relates to a method of effectively producing such diamond.

BACKGROUND OF THE INVENTION

Diamond fine powders less than one micrometer in nominal average particle size (APS) are available on the market as a grinding medium, and even superfine powders of 5 nm (nanometers) for lubrication, surface modification and polishing applications. They are often used with a specific dispersion medium, in order to achieve a uniform deposit of single particle thickness on a support body, or a regular distribution of separate particles in the matrix.

Diamond particles are often at a decreased surface energy level due to the combination with different atoms or groups, although the surfaces may be sometimes made up of carbon atoms joined with each other. Thus the physical and chemical properties of diamond particles are affected by the surface state, increasingly with the decrease in particle size, and essentially for submicron sizes, in addition to their bulk properties. So the dry agglomeration and affinity to aqueous or oily medium of particles, in particular, depend essentially on the atoms or groups, adsorbed or combined with carbon atoms in the surface layer. Possible atoms and groups are collected and out-lined, along with techniques for providing them, by N. V. Novikov in "The Physical properties of diamond", Naukova Dumka (1987).

Diamond fine powders are commonly prepared by crushing coarser particles of either natural or synthetic origins, the latter being produced by static compression at high temperatures on a hydraulic press or dynamic compression by means of explosive detonation. They, natural or synthetic, assume a set of specific properties which vary with the different set of physical and chemical processes they were subjected on the way to the end products.

Diamond from a hydrostatic press, for example, contains metallic or nonmetallic substances which derive from the flux and specimen accommodation materials employed in the process, and which exist in the crystals as an impurity. Some kinds of impurity may be removed and the powder be purified to a degree, as the particles undergo chipping or splitting during the crushing process, preferentially at crystal defects and expose the foreign substance within, which is to be dissolved during the acid treatment. However there are other impurities, including chromium from the crushing machine and graphite remaining unconsumed and trapped in the particles which then are exposed or released by the breakdown. As insoluble to the acids, they accumulate in the solution and accompany with the finest fraction when recovered. As a result, the class zero diamond powders, which contain the undersize end, often exhibit a light to dark grayish color due to those impurities.

As for the dynamic compression synthesis technique, whose mechanism has not fully been understood, diamond fine powders contain impurities whose origin is not always identified. However there are some elements, beside graphite, which should evidently derive from the specimen receptacle material or, at least, matrix material for the process.

Synthetic diamonds in general may be somehow more hydrophilic than natural ones as a result of the treatments the former undergo, before it is isolated as separate particles, with or in various chemical solutions which can leave oxygen atoms or hydroxy groups, combined with carbon atoms on the particle surface. Although such quality even causes a trouble in establishing a reproducible size grading of micron sizes by affecting Stokes's relationship between particle size and sedimentation rate in the elutriation process. If so, the treated diamond particles in general are not in a surface state which would form a stable suspension or dispersion in a polar solvent such as water and alcohol.

Besides oxygen and hydroxy atom and group, presence of several elements as impurities has been recognized by ICP spectrometry or inorganic qualitative analysis. They include Si, Al, Fe, Cr, Mn, Cu, Ca, S and C. It appears that some of them are somehow interactive with the surface of diamond particles whichever the production process is, and causes agglomeration of said particles in the aqueous environment. Thus impurities make most fine diamond powders so far available tend to form an agglomeration, which is almost impossible to completely break down in polar or nonpolar medium, even under ultrasonic vibration. It is further observed that such fine particles, once separated, readily gather and form again an agglomeration and begin to sediment.

Diamond fine powders are promising materials for the use in tribologic and abrasive applications as well as surface modification, if they can be successfully separated into single particles and distributed in a matrix or spread on a carrier body. While it is understood that such quality can be achieved by either eliminating the above said interaction or by improving the wettability of the diamond surface with the medium employed, no effective techniques have been available for the purposes.

Metal or ceramic materials coated with diamond fine particles could be useful as a wear resistant material. It is essential, however, to keep the diamond particles in stable suspension, with the diamond concentration or particle distribution unvarying over the deposition process, for example.

Therefore one of the principal objects of the invention is to provide diamond fine particles with a surface nature so improved as to form a stable, uniform suspension or dispersion in a common medium such as water and alcohol.

Another object is to provide an effective technique for producing hydrophilic diamond fine particles by chemically modifying the particle surface nature, while removing at the same time contaminants and foreign materials which coexist with the diamond.

DETAILED DESCRIPTION OF THE INVENTION

In the invention diamond particles are treated by boiling in the treatment fluid of sulfuric acid solution, which is in particular of concentrated or fuming nature, at a temperature more than 200° C., which is preferably 250° C. or more. Thus hydrophilic diamond fine particles are left and recovered with hydrophilic atoms and/or groups formed on the surface, while contaminants and foreign matters are removed from among the particles or from the surface as chemically decomposed and dissolved into the solution.

Said treatment fluid may further comprise one or more of nitric, perchloric and permanganic and other inorganic acid as an oxidizer, as well as potassium or other metal nitrate. They are used essentially in combination with concentrated or fuming sulfuric acid, in order to achieve a corresponding effect at lower temperatures.

Results are more appreciable and the increase in suspension stability is greater with finer particles. Coarser particles are more susceptible to the gravity and thus are more difficult to hold a good suspension in a medium for a sufficient time. Thus the method of the invention employs average particle sizes of—or less than 2 $\mu$m (micrometer), and the diamond particles as treated hold suspension practically without sedimentation in purified water for, at: least, 30 minutes with the 2 $\mu$m size and more than 2 hours with 1 $\mu$m or less size. Further finer particles can exhibit a further longer suspension holding time of, for example, more than 24 hours for a size of 200 nanometers or less. A suspension time of 6 hours or more also is achieved with such ultrafine particles in a pH 4.0 acidic aqueous solution of inorganic acid. Hydrophilic diamond surface which allows such good suspension is produced by the method of the invention at a good reproducibility.

Since polar media such as water and alcohol are commonly used for distributing diamond particles in, the latter should be more favored as versatile if, and when, they are of hydrophilic nature and, at the same time, free of contaminants or foreign matters on or among the particles. If the impure diamond particles tend to agglomerate in acidic media, the alkaline solution connot always be applicable but just sometimes employed, for the purpose of keeping the particles in suspension.

The distribution of diamond particles in an aqueous medium is also affected by the presence of some ion species. Thus hydrophilicity is essentially evaluated in the invention in terms of suspension stability or the duration for which the suspension is sustained in a purified aqueous medium at pH=7.0 of deionized or distilled water.

The diamond particles of the invention is produced, essentially, by providing fine diamond particles of APS of or less than 2 $\mu$m, placing and heating said diamond particles in an oxidizing medium at a temperature of at least 200° and, preferably, 250° C., whereby hydrophilic atoms and/or functional groups such as C=O and OH, for example, are provided on the furface of the diamond. Contaminants and foreign matters are also removed at the same time.

The treatment temperature should not exceed 350° C. since oxidization loss is noticeable at said temperature and more, with particle size less than 1 $\mu$m.

For coarser particles greater than 1 $\mu$m, a higher temperature of 400° C. is considered as the upper limit because of the equipment material availability and process controllability, although the oxidization loss becomes significant only above 500° C., approximately.

In the sulfuric acid treatment of the invention metallic impurities and graphite are oxidized with $SO_3$ to be dissolved as a sulfate and to form a gaseous product. A high acidic aqueous solution, which forms when the treatment solution is diluted with water upon the termination of the process, is very effective for the removal of the metallic impurity and thus the probable nuclei and origins of particle agglomeration. At the same time oxygen atoms are combined with carbon atoms to form C=O bonds, or further OH groups by the subsequent hydration on the treated diamond particles, which as a result should probably acquire a hydrophilic nature. Such effects are more apparent with finer particles, with a stable suspension in a pH 4.0 acidic solution of inorganic acid holding at least 6 hours with an average particle size of or less than 200 nm.

Nitric, perchloric, chromic and permanganic acid as well as potassium or other metal nitrate are available singly or in combination as an oxidizer and added to the basic solution of sulfuric acid, in order to decrease the treatment temperature. With the oxidizer, as a surface analysis showed the presence of C=O and OH, it can be assumed that a corresponding process takes place as in the oxidizer-free fluid but at lower temperatures.

It is not essential to the invention but optional as desired, treatment with perchloric, hydrofluoric acid or in molten alkaline salt may be added either before or after the sulfuric acid treatment, in order to remove principally graphite, silica or silica and alumina, respectively.

The hydrophilic fine powder of diamond of the invention exhibits good resistance to agglomeration: it disperses, apparently in single particles as soon as put in water, to form an opaque fluid. In fact a particle size measurement suggests that they are distributed completely in single or little agglomerated particles, and thus they are covered with hydrophilic atoms or groups. Breaking down of the powder by ultrasonic vibration or the like is usually unnecessary.

Since the diamond particles of the invention, as described above, exist in the suspension practically in single or little agglomerated particles, they can be used to form a monoparticle layer or a mixture of high uniformity with another particle substance. Here the concentration can be controlled, as necessary, or a homogeneous mixture with a monomer in the production of plastic material can be achieved by using a solvent which exhibits mutual solubility to water.

The diamond powder of the invention can be used in various ways. A starting material of conventional clustered diamond powder can be treated by the method discribed above to prepare a suspension in water/alcohol mixture. A sheet of silicon is dipped to deposit a layer of diamond fine particles, and used in a diamond CVD process as a substrate with a high concentration of nucleation sites.

By a similar technique a sheet of metal or plastic, for example, may be dipped in or spread over with suspension of submicron diamond particles, in order to prepare an abrasive sheet practically free of irregularity in particle size or distribution.

An abrasive tool with a few micrometer diamond particles uniformly distributed in the matrix can be produced by first preparing a suspension of treated diamond particles, which then is mixed with a fluid or powder of matrix material.

Now the invention is illustrated by means of examples, in which the starting point of sedimentation is defined as the time when a clear top has become noticeable in the observation in a test tube, left still, of 25 ml sample suspension, which is taken from the bulk prepared from 200 mg of diamond particles in 100 ml of purified water of pH=7.0. Particle sizes are evaluated by centrifugal sedimentation for the 300 nm or less, while laser diffraction scattering technique was used for the coarser particles.

EXAMPLE 1

Commercial cluster diamond of nominal average size of 5 nm was used as a starting material. This was a dark brown powder of agglomerated secondary particles when observed by optical microscopy at a magnification of 400. They were subjected to an ultrasonic vibration in water or acetone, but it was almost impossible to break down into single particles. In fact, after they looked like separated for some time, they readily gathered again and began to sediment. They were then heated in concentrated sulfuric acid to about 100° C. for 2 hours and rinsed fully in water. When placed in purified water, however they began to sediment after a couple of minutes.

20 grams of such diamond particles were put in a flask which was filled with 200 ml of a mixture of 5% conc.

$HNO_3$ and 95% conc. $H_2SO_4$, subjected to an ultrasonic vibration to break down, and then heated at 300° to 320° C. for 2 hours. The acid medium, as cooled down, was diluted with adequate volume of water, separated in a centrifugal separator, rinsed in water and dried. Grayish brown fine powder was recovered as a result. As simply added to purified water, it readily spread, without ultrasonic vibration, in almost unnoticeable particles to form a grayish fluid, which held suspension from settling and showed no practical change over 72 hours.

Then sulfuric acid was added to the suspension to control the pH at 4.0 and set a slight acidity. There was no noticeable sedimentation after 12 hours, or a stable suspension was sustained also in this case of a modest acidity.

Then the diamond was used for originating the nucleation in a diamond CVD process. 0.1 gram of clustered diamond, as treated, was added to 1 liter of purified water. 1 volume part of the suspension was further mixed with 2 part of methyl alcohol to prepare the treatment fluid, in which a silicon sheet was dipped briefly, dried with a toilet hair drier, and placed in a chamber for a microwave plasma diamond CVD process. After the 10 minutes, an approximate 50 nm uniformly thick deposit was recognized. The nucleation density, evaluated after the first 5 minutes, indicated a nucleus density of about $5 \times 10^{11}$ per 1 $cm^2$. This means even more diamond particles were distributed uniformly on the silicon sheet by the dipping and were available as nucleation sites.

Reference

For the purpose of comparison, another suspension was prepared by adding micronsize diamond under ultrasonic vibration as a conventional technique. A silicon sheet was dipped and scratched on the surface, and subjected to a CVD process at corresponding parameters to the above. The nucleus density was $1 \times 10^{10}$ at a maximum 2 to 4 hours of process was necessary before a uniformly thick deposit was achieved.

EXAMPLE 2

0–¼ size grade diamond was treated. This was a dark gray fraction of 180 nm in average particle size, separated and recovered by a centrifugal separator from the ¼ size and coarser. The quasi-quantitative analysis by ICP indicated a concentration of 0.1 to 0.2% for each of Al, Si, Cr and Fe, as impurities.

500 ml of sulfuric acid was added to 100 grams of the diamond powder, which was then heated at 280 to 320° C. for 6 hours, and further treated in hydrofluoric acid. The recovered powder was clear white, and the ICP analysis indicated each impurity content less than one tenth the initial levels. Also as analyzed by IR absorption the diamond particles exhibited the existence of functional groups OH and =C=O on the surface. The treated particles, when added to purified water, formed a white suspension, which held from settling for more than 48 hours. The suspension was sustained for more than 6 hours in a hydrochloric acid solution at an acidity of 4.0.

Raman spectroscopy was employed for the evaluation of the treatment of the invention with the diamond particles before and after the treatment. While untreated particles, on the laser irradiation, burnt explosively by energy absorption, so the observation could not be continued, the treated powder, without any difficulty in observation, yielded a clear record showing exclusively the spectrum for diamond.

Treated diamond particles were held in suspension and deposited by electrolysis. A substrate of 10 mm thick SUS (JIS) stainless steel strip was polished in a 100×100 mm area for the deposition. 5 grams of the diamond was put in 1 liter of plating solution along with 300 grams of nickel sulfate and 50 grams of nickel chloride. The electrodeposition was continued, without a forced agitation, at a pH of 4.5, a temperature of 50° C., and a density of 2 $A/dm^2$, until a 5 $\mu$m thick layer was deposited.

A SEM observation showed that some 25 vol. % diamond particles were anchored with nickel. The coated steel strip was successfully used as a chute material for a ceramic forming press.

EXAMPLE 3

0–2 micronsize diamond was treated. This was a gray fraction of 1.06 $\mu$m in average particle size, separated and recovered by the technique used in example 2, from the 2 $\mu$m and greater sizes.

500 ml of sulfuric acid and 50 mg of $KNO_3$ were added to 100 grams of the diamond powder, which was then boiled by heating at 210° to 230° C. for 3 hours. The recovered powder was clear white, and, when put in purified water, formed opaque fluid, which held suspension without any noticeable sedimentation during the 12 hours of observation, in comparison with untreated diamond powder which began to sediment an hour after adding to the medium.

The treated powder was deposited along with nickel metal by the technique described above and at the corresponding parameters to a 10 $\mu$m thickness on a 30 by 600 mm rectangular area of a SUS 304 grade stainless steel work holder blank for the centerless grinder. The diamond deposited work holder remained useful for more than 3 months in the grinding of sintered alumina, in comparison with undeposited holders which needed to replace every two weeks because of severe wear.

EXAMPLE 4

2–3 grade micronsize diamond powder was treated. It comprised grayish white particles of 1.98 $\mu$m in average particle size. 200 grams of the powder was put in 800 ml of sulfuric acid, heated and boiled for 2 hours at 210° to 240° C., while adding chromic acid intermittently, so that the chromate red was maintained. The recovered powder as cooled down and fully rinsed was white and, when put in purified water, formed an opaque suspension. Sedimentation remained unnoticeable two hours after the suspension was formed, in comparison with the untreated powder which showed a significant sedimentation immediately after it was put in the water.

100 ml of methyl alcohol was poured to 10 grams of the treated diamond powder to form a suspension, which was further mixed with 50 grams of phenolic resin and then fully agitated. The mixture was moderately heated to evaporate the alcohol until a thick fluid was obtained, which was then casted in a mold, pressed at 200 $kg/cm^2$ while heating at 190° C., in order to manufacture a 150 mm O.D., 100 mm I.D. type 6A2 cup wheel. The product tool, which was basically for the use in preparation of microscopic specimens of carbide alloy, comprised a working part of practically single diamond particles distributed in the matrix.

EXAMPLE 5

So-called grade--zero micronsize diamond particles were put in water to form a suspension and left still for 24 hours. The fluid was separated in a centrifugal separator into the clear top and solid, and the latter, which comprised black particles of 90 nm average particle size, was recovered for the treatment of the invention. 100 mg of the powder was mixed with 500 ml of sulfuric acid and 50 ml of $HNO_3$, and then boiled for 4 hours at 270 to 300° C. The recovered powder was gray and when put in purified water formed a grayish-white suspension, which showed no noticeable sedimentation 72 hours after it was formed. The fluid was diluted with water to a concentration of 100 ppm., to which a silicon sheet was dipped and placed in a chamber for a CVD process and used for the nucleation as described in example 1. Diamond was formed at a nucleus density of about $1 \times 10^{11}$.

EXAMPLE 6

100 grams, constantly, of diamond powders of different sizes were treated in common for an hour at varying parameters. The recovered powders, which were suspended in purified water, were left still to evaluate the suspension stability in terms of the suspension holding time, or the time lapse before the sedimentation became noticeable. The results are compared below as well as the parameters used.

| size design | a.p.s. (nm) | sulfuric acid (ml) | oxidizer sort | oxidizer amount | Temp. (° C.) | stability (hour) |
|---|---|---|---|---|---|---|
| 1–2 | 1530 | 500 | — | — | 300–320 | 1 |
|  |  | 500 | $HClO_4$ | 50 ml | 210–230 | 4 |
| 0–1 | 540 | 800 | — | — | 300–320 | 9 |
|  |  | 800 | $HNO_3$ | 50 ml | 280–300 | 20 |
| 0–½ | 420 | 800 | — | — | 290–310 | 12 |
|  |  | 800 | $KNO_3$ | 100 g | 240–270 | 30 |
| 0–⅙ | 140 | 800 | — | — | 290–310 | 30 |
|  |  | 800 | $KNO_3$ | 100 g | 240–270 | 60 |

Note: * average particle size

As described above in detail, diamond superfine particles of modified surface nature are provided by the invention, whereby diamond particles are intensely heated in sulfuric acid in order to impart hydrophilic nature, while coexisting contaminants are removed. They when put in water form a stable suspension which is well resistant to settling.

Diamond particles so treated may find various applications: cluster diamond, for example can be treated and added to purified water to form suspension. A silicon sheet is dipped in it to deposit a layer of densely and uniformly distributed diamond particles which allow nucleation and subsequent growth of by far increased diamond particles on the sheet and, thus, a film improved in thickness uniformity.

What is claimed is:

1. A suspension comprising:
   single, hydrophilic diamond particles having a chemically modified particle surface produced by an oxidizing medium dispersed in aqueous solution at a pH of 7.0, wherein:
   at least 90% by weight of said diamond particles having an APS of 1000 or more but less than 2000 nanometers dispersed in said aqueous solution exhibit a suspension holding time of at least 0.5 hours;
   at least 90% by weight of said diamond particles having an APS of 500 or more but less than 1000 nanometers exhibit a suspension holding time of at least two hours;
   at least 90% by weight of said diamond particles having an APS of 200 or more but less than 500 nanometers exhibit a suspension holding time of at least eight hours; and
   at least 90% by weight of said diamond particles having an APS of less than 200 nanometers exhibit a suspension holding time of at least 24 hours.

2. The suspension as claimed in claim 1, in which said diamond particles having an APS of 1000 or more but less than 2000 nanometers exhibit a suspension time of at least one hour.

3. The suspension as claimed in claim 1, in which said diamond particles having an APS of 500 or more but less than 1000 nanometers exhibit a suspension holding time of at least four hours.

4. The suspension as claimed in claim 1, in which said diamond particles having an APS of 200 or more but less than 500 nanometers exhibit a suspension holding time of at least 16 hours.

5. The suspension as claimed in claim 1, in which said diamond particles having an APS of less than 200 nanometers exhibit a suspension holding time of at least 48 hours.

6. The suspension as claimed in claim 1, wherein the oxidizing medium comprises sulfuric acid.

7. A method of producing a suspension of diamond particles, comprising: providing a mass of size-graded diamond particles which exhibit an APS of or less than 2000 nanometers, placing and heating said diamond particles in an oxidizing medium at a temperature of at least 200° C., whereby hydrophilic functional groups are formed on the surface of the diamond, recovering and rinsing said diamond particles, and placing said particles in a dispersion solution.

8. The method as claimed in claim 7, in which said temperature is in excess of 250° C.

9. The method as claimed in claim 7, in which said oxidizing medium comprises one selected from concentrated sulfuric acid and fuming sulfuric acid.

10. The method as claimed in claim 9, in which said oxidizing medium further comprises one selected from nitric acid, perchloric acid, chromic acid, permanganic acid, and nitrate.

11. The method as claimed in claim 10, in which said nitrate comprises potassium nitrate.

12. A material comprising:
   single, hydrophilic diamond particles with an average particle size of less than 2000 nanometers in APS, said diamond particles having a chemically modified particle surface produced by an oxidizing medium such that said diamond particles are dispersible in an aqueous solution having a pH of 7.0, wherein:
   at least 90% weight of said diamond particles having an APS of 1000 or more but less than 2000 nanometer exhibit a suspension holding time of at least 0.5 hours;
   at least 90% weight of said diamond particles having an APS of 500 or more but less than 1000 nanometers exhibit a suspension holding time of at least two hours;
   at least 90% by weight of said diamond particles having an APS of 200 or more but less than 500 nanometers exhibit a suspension holding time of at least eight hours; and
   at least 90% by weight of said diamond particles having an APS of less than 200 nanometers exhibit a suspension holding time of at least 24 hours.

13. The material of claim 12 wherein the oxidizing medium comprises sulfuric acid.

14. A suspension of diamond particles of less than 200 nanometers in APS, dispersed in acidic aqueous medium with inorganic acid, at least 90% weight part of which exhibit a suspension holding time of six hours or more at a pH of 4.0.

* * * * *